United States Patent [19]

Johnston

[11] Patent Number: 4,873,766

[45] Date of Patent: Oct. 17, 1989

[54] POWER SAW

[76] Inventor: Robert H. Johnston, 311 NW. 97 La., Coral Springs, Fla. 33065

[21] Appl. No.: 186,024

[22] Filed: Apr. 25, 1988

[51] Int. Cl.⁴ .............................................. B23D 45/16
[52] U.S. Cl. ...................................... 30/166.1; 30/388
[58] Field of Search .................. 30/381–387–388–391, 30/122, 500, 166 R

[56] References Cited

U.S. PATENT DOCUMENTS

| 2,357,953 | 9/1944 | James | 30/390 |
| 2,827,932 | 3/1958 | Strunk | 30/386 |
| 4,202,096 | 5/1980 | Nagashima | 30/381 |
| 4,270,270 | 6/1981 | Loyd | 30/386 X |
| 4,413,705 | 11/1983 | Inaga et al. | 30/381 X |

FOREIGN PATENT DOCUMENTS 809605  7/1951  Fed. Rep. of Germany ........ 30/381

Primary Examiner—Frank T. Yost
Assistant Examiner—Michael D. Folkerts

[57] ABSTRACT

The portable, hand held power saw having, integrally constructed therewith, an internal combustion engine to avoid the needs for any form of battery or external electrical power supply.

2 Claims, 2 Drawing Sheets

POWER SAW

BACKGROUND OF THE INVENTION

The present invention relates to power hand tools and, more particularly, to a portable power saw having a self-contained engine.

Battery powered portable tools have long been known in the art and have proved useful in regard to such devices as wrenches, screwdrivers, and jigsaws. Such battery-power tools are not suitable for high power construction tools.

Similarly, certain large pieces of equipment and, most notably, portable chain saws, have long been equipped with internal combustion engines to permit one working in the outdoors to operate the saw without need for a portable electric generator. Such prior art, as best known to the inventor, is represented by U.S. Pat. No. 2,697,457 (1954) to Lawrence, entitled Manually Portable Brush Cutting Power Tool; No. 2,698,034 (1954) to entitled Portable Chainsaw with Detachable guards; No. 3,346,955 (1967) to entitled Tree and Hedge Trimmer; No. 4,179,805 (1979) to entitled Portable Power Operated Tool; and No. 4,696-108 (1987) to entitled Pruning Apparatus.

Many other examples of equipment intended for outdoor use in areas removed from electric availability show the use of an internal cumbustion engine as a power means. However, no prior art known to the inventor makes use of an internal combustion, or gas, engine in integral combination with a hand held power saw of the type that is widely used by builders and handymen in construction and related work.

The need for such a device has been long felt in the art in that it, heretofore, has been necessary to employ a long electrical extension cord from a hand-held power saw to electrical outlet or, alternatively, to a portable electrical generator, in order to power the hand held portable saw. This, understandably, resulted in considerable inconvenience and, in the case of work done on ladders or at elevations above the one ground, must contend at all times with the location, positioning and potential change in position in the extension cord. It is, for example, not uncommon for an electrical extension cord to a portable hand held powered saw to become entangled in the feet of the user, the ladder or blade of the power saw.

It is, therefore, in response to the above problem in the art that the instant invention is directed.

SUMMARY OF THE INVENTION

The present invention constitutes a portable, hand held power saw system integrally including therewith a internal combustion, or gas, engine which provides rotational input and power to the blade.

It is thereby an object of the present invention to provide a portable hand-held power saw or the like having a self-contained power source which, therefore, will obviate the need for an external power input.

It is another object of the present invention to provide a portable hand held power saw or the like which will have enhanced ease of use, convenience, and safety in the use thereof.

The above and yet other objects and advantages of the present invention will become apparent from the hereinafter set forth Detailed Description of the Invention, the Drawings, and claims appended herewith.

DETAILED DESCRIPTION OF THE INVENTION

Figure 1:
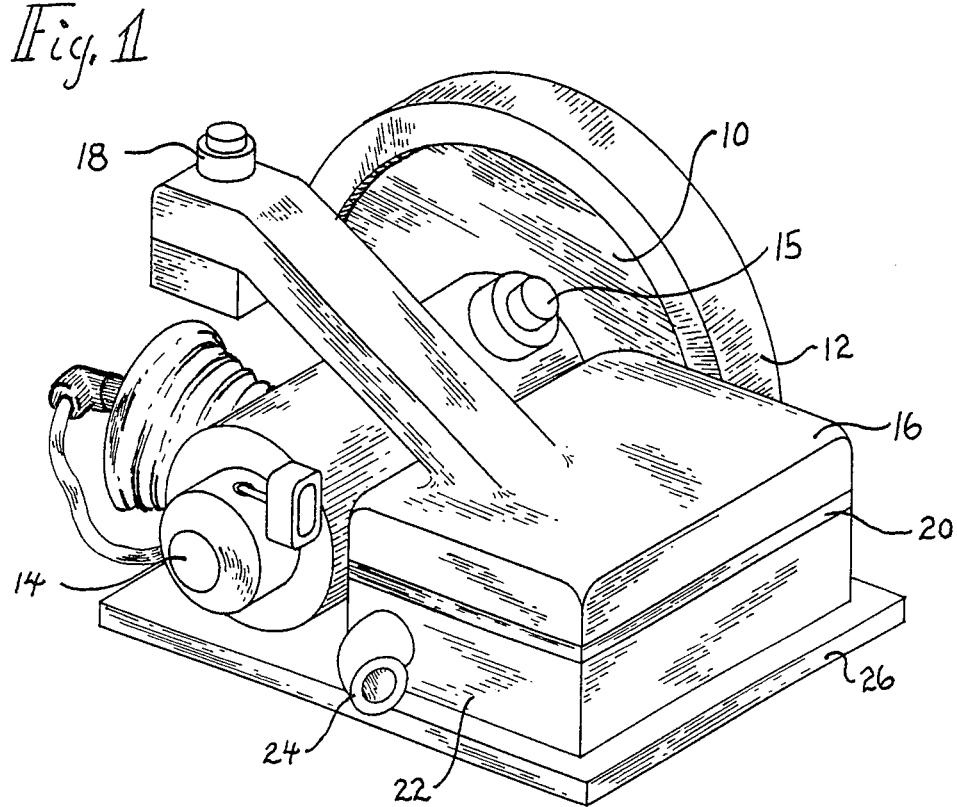
FIG. 1 is a perspective view of the inventive portable power saw system.

With reference to the perspective view of FIG. 1, the present inventive hand held portable powersaw is seen to include a blade having a retractable cover 12. To the left of the figure is shown a gas engine 14 which powers blade 10 through a rotational power shaft 15.

An engine of suitable size would be a 25 cubic centimeter engine. Such engines are manufactured by Kawasaki, Inc.

The gas engine is supplied with fuel through a gas tank 16 which, as may be noted, is formed in the shape of a handle of the inventive power saw. The gas cap for said gas tank 16 is shown at 18.

Beneath the forward portion of gas tank 16 is shown thermal barrier 20. There beneath is a muffler (or baffle) 22 having a muffler exhaust pipe 24. It is to be appreciated that the use of a muffler and muffler exhaust is necessary to reduce the noise level of the output of any gas or internal combustion engine.

The muffler 22, as well as the gas engine 14, are mounted upon a rigid level support surface 26.

Figure 2:
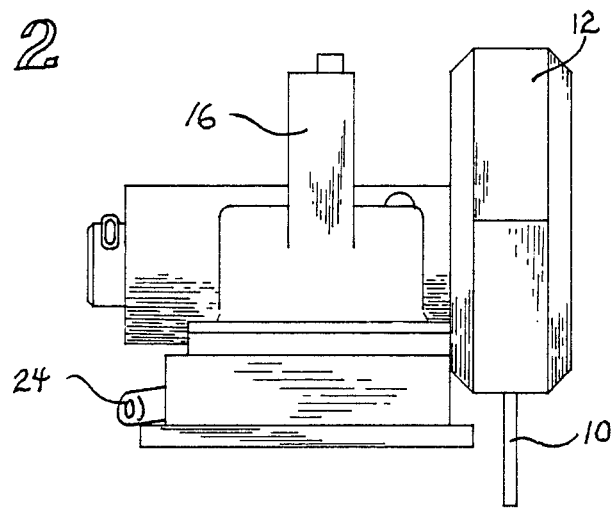
FIG. 2 is a front view thereof.

With regard to the front view of FIG. 2, the transverse arrangement and suggested proportion of the elements of FIG. 1 are shown.

Figure 3:
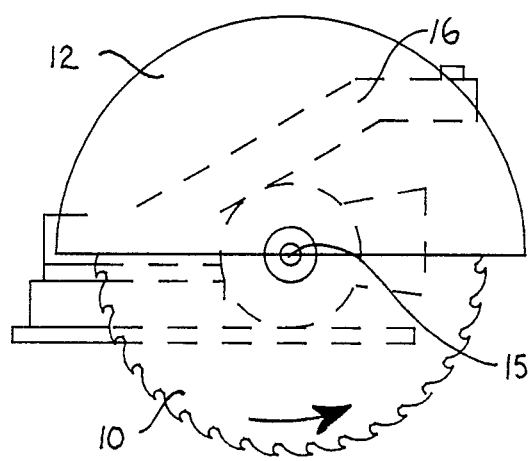
FIG. 3 is a right side view of the inventive power saw.

Similarly, in view of FIG. 3, there is shown, from the right side of the system, the retractable cover 12, the handle shaped gas tank 16, the power train 15, and the blade 10.

Figure 4:
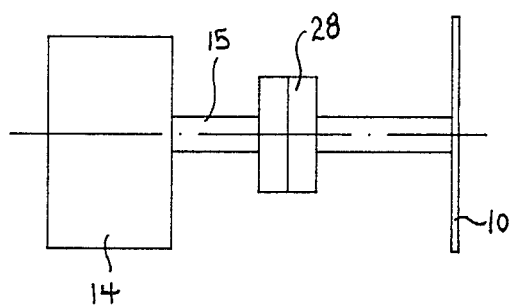
FIG. 4 is a axial schematic view taken along the power shaft the system.

In FIG. 4 the power train of the device is shown in axial schematic view. More particularly, the engine 14 with relationship to the power shaft 15 and blade 10 is shown. Further, mechanical coupling 28 is shown between engine 14 and shaft 15.

Figure 5:
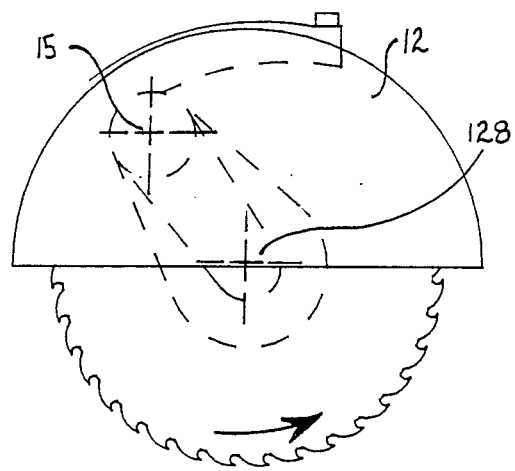
FIG. 5 is a schematic of an embodiment showing the use of a clutch in combination with the engine.

In the view of FIG. 5, an embodiment showing the use of the mechanical coupling 28 is shown, a clutch 128 is schematically illustrated, the purpose of which is to perform a step down of the speed output of the engine. Many types of clutches will prove suitable for this application.

In view of the above, it is to be appreciated that there is provided a completely portable hand held power saw having a self-contained power input and that, thereby, the need for any form of external number input is avoided. Similarly, the use of batteries, which as noted in the Background of the Invention, have proved inadequate as a power saw power source for "heavy duty" construction applications is also avoided.

Accordingly, while there has been shown and described the preferred embodiment of the present invention, it is to be appreciated that changes may be made in the details and particulars of the present invention without departing from the underlying scope of the invention as set forth in the claims appended herewith.

Having thus described my invention what I claim as new, useful and non-obvious and, accordingly, secure by Letters Patent of the United States is:

1. A portable hand held power saw, comprising:
   (a) an internal combustion engine having a rotational mechanical output, said engine mounted upon a rigid level platform;
   (b) a gas tank for supplying fuel to said engine, said gas tank comprising a part of a handle for the holding of said power saw;
   (c) a muffler and exhaust system secured intermediately between said gas tank and said rigid platform, said muffler in fluid communication with said internal combustion engine and hot vapor generated thereby;
   (d) a work element coupled to said mechanical output of said gas engine; and
   (e) mechanical clutch coupling means interposed between said output of said engine and said work element along the axis of rotation of said work element.

2. The portable saw as recited in claim 1, in which said work element comprises a circular saw blade.

* * * * *